US012216264B2

United States Patent
Liu et al.

(10) Patent No.: US 12,216,264 B2
(45) Date of Patent: Feb. 4, 2025

(54) DARK-FIELD CONFOCAL MICROSCOPIC MEASUREMENT APPARATUS AND METHOD BASED ON VORTEX DICHROISM

(71) Applicant: Harbin Institute of Technology, Harbin (CN)

(72) Inventors: Jian Liu, Harbin (CN); Chenguang Liu, Harbin (CN); Zijie Hua, Harbin (CN)

(73) Assignee: Harbin Institute of Technology, Harbin (CN)

( * ) Notice: Subject to any disclaimer, the term of this patent is extended or adjusted under 35 U.S.C. 154(b) by 0 days.

(21) Appl. No.: 18/739,866

(22) Filed: Jun. 11, 2024

(65) Prior Publication Data

US 2024/0329377 A1  Oct. 3, 2024

Related U.S. Application Data

(63) Continuation of application No. 18/433,985, filed on Feb. 6, 2024, now abandoned.

(30) Foreign Application Priority Data

Mar. 16, 2023  (CN) .......................... 202310253087.2

(51) Int. Cl.
  *G02B 21/00*  (2006.01)
  *G01N 21/88*  (2006.01)
  *G02B 21/26*  (2006.01)

(52) U.S. Cl.
  CPC ..... *G02B 21/0032* (2013.01); *G01N 21/8806* (2013.01); *G02B 21/26* (2013.01);
  (Continued)

(58) Field of Classification Search
  CPC .... G02B 21/0032; G02B 21/26; G02B 21/00; G02B 21/0004; G02B 21/002; G02B 21/0024; G02B 21/0052; G02B 21/0068; G02B 21/0092; G02B 21/06; G02B 21/10; G02B 21/36; G02B 21/361; G02B 21/367; G02B 27/28; G02B 27/286;
  (Continued)

(56) References Cited

FOREIGN PATENT DOCUMENTS

CN  112710641 A  *  4/2021  ............ G01J 3/2823

* cited by examiner

*Primary Examiner* — Arnel C Lavarias
(74) *Attorney, Agent, or Firm* — IPro, PLLC

(57) ABSTRACT

Disclosed are a dark-field confocal microscopic measurement apparatus and method based on vortex dichroism. The apparatus includes an array vortex light generation module, an array vortex light illumination module and an array dark-field confocal detection module; an array vortex wave plate of the array vortex light generation module generates vortex light to illuminate a sample of the array vortex light illumination module; and the array dark-field confocal detection module extracts scattering signals, and identifies differences between scattering signals collected under the illumination of opposite-order vortex light. Three-dimensional distribution information of defects, such as subsurface scratches, abrasion, subsurface cracks, and bubbles, can be extracted by directly analyzing the scattering signals under the 1-order vortex illumination; and chirality information of the micro-nano material can be obtained by analyzing difference values of the scattering signals under the illumination of the opposite-order vortex light.

8 Claims, 1 Drawing Sheet

(52) U.S. Cl.
CPC .............. *G01N 2021/8822* (2013.01); *G01N 2021/8848* (2013.01)

(58) Field of Classification Search
CPC ....... G01N 21/8806; G01N 2021/8822; G01N 2021/8848; G01N 21/896; G01N 21/958
USPC ....... 359/386, 362, 363, 368, 369, 385, 388, 359/389, 390; 356/364, 365, 369, 237.1, 356/239.1, 239.7, 239.8, 237.2, 237.3
See application file for complete search history.

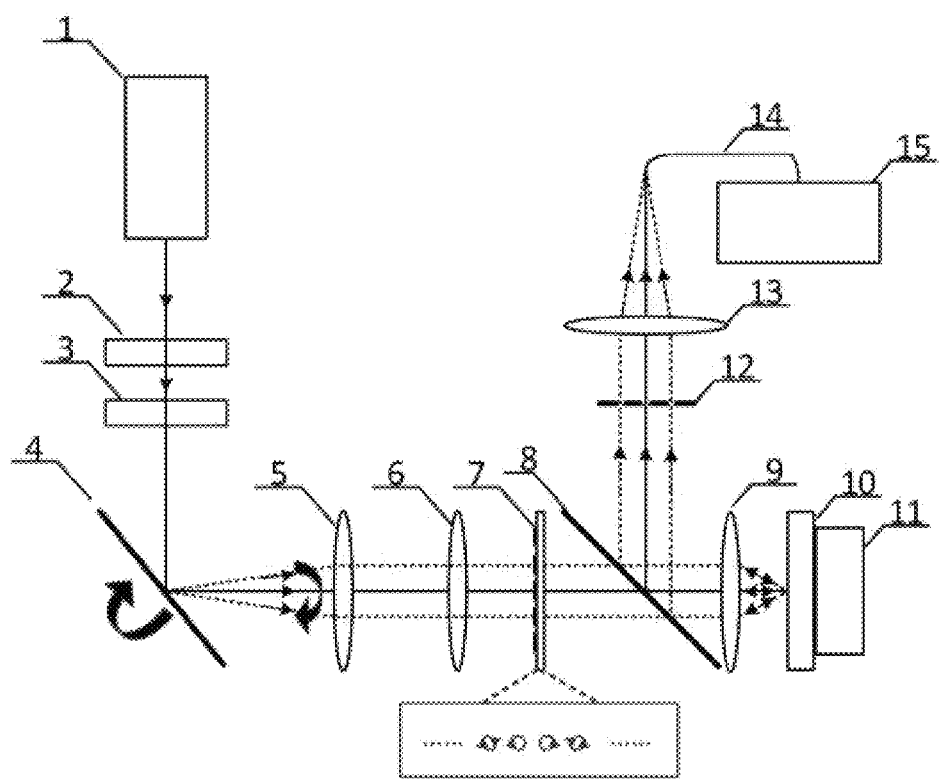

DARK-FIELD CONFOCAL MICROSCOPIC MEASUREMENT APPARATUS AND METHOD BASED ON VORTEX DICHROISM

TECHNICAL FIELD

The present disclosure belongs to the technical field of optical precision measurement, and mainly relates to a dark-field confocal microscopic measurement apparatus and method based on vortex dichroism. Vortex light illumination is generated through an array vortex wave plate, scattering signals are then extracted, and at the same time, intensity differences between the scattering signals under the illumination of ±m-order vortex light are identified to observe vortex dichroism, and structural features, such as chirality information, of micro-nano material can be then obtained.

BACKGROUND

High-performance optical elements and optical materials are widely used in precision instrument manufacturing and significant optical engineering research, and are the foundation of the performance of an optical system. Therefore, high-precision detection of defects in mechanical structures, chemical composition and lattice structures on surfaces and subsurfaces of the optical elements and optical materials play an important role in industrial manufacturing. A chirality of the defects in an optical element will seriously affect the light field distribution of incident light beams, and weaken the light spot quality.

Enjoying such advantages as good optical tomography capability, relatively high imaging resolution, and relatively high imaging contrast caused by a dark background, the dark-field confocal microscopic measurement technology has become an important means for nondestructive three-dimensional detection of the optical elements. Ordinary optical dark-field confocal microscopic measurement technology can only detect geometrical defects in a sample, such as scratches, and bubbles, but it cannot acquire other physico-chemical properties of the defects. In order to characterize defect characteristics of the optical elements and materials more comprehensively, and to facilitate identification and classification of the defects more accurately, microscopic measurement methods integrating various modes are increasingly applied to the field of defect detection. However, powerful tools are unavailable for chiral detection of the sample.

Therefore, how to provide chiral detection tools for the sample to achieve effective detection of the sample has become an urgent problem to be solved by those skilled in the art.

SUMMARY

A brief overview of the present disclosure is given below in order to provide a basic understanding of some aspects of the present disclosure. It should be understood that such overview is not an exhaustive overview of the present disclosure. It is not intended to identify key or important parts of the present disclosure, nor to limit the scope of the present disclosure. Its purpose is merely to present some concepts in a simplified form as a prelude to a more detailed description to be discussed later.

The present disclosure provides a dark-field confocal microscopic measurement apparatus and method based on vortex dichroism, which adopt vortex scattering dichroism spectrum analysis to obtain chirality information of a micro-nano structure while utilizing dark-field confocal under the illumination of multi-order vortex light to obtain structural information of micro-structure samples and defect information of industrial optical samples, such as scratches, and abrasion, and also the vortex scattering dichroic spectrum analysis is adopted to obtain chirality information of micro-nano structures, providing a new way for detection of the micro-nano structures. Compared with the prior art, the apparatus and method provided in the present disclosure solve the problems that the ordinary dark-field confocal technology has a single imaging mode and is able to obtain the chirality information of samples, and physical property detection and analysis are achieved to a certain extent.

In order to achieve the above objective, the present disclosure adopts the following technical solution:

The present disclosure provides a dark-field confocal microscopic measurement apparatus based on vortex dichroism, including an array vortex light generation module, an array vortex light illumination module and an array dark-field confocal detection module;

the array vortex light generation module includes the following components in sequence according to a direction of light propagation: a laser, a half-wave plate, a quarter-wave plate, a one-dimensional scanning galvanometer, a scanning lens, a tube lens and an array vortex wave plate, vortex illumination light beams are generated and irradiated to the array vortex light illumination module via a non-polarizing beam splitter;

the array vortex light illumination module includes the following components in sequence according to a direction of light propagation: the non-polarizing beam splitter, an objective lens, a sample to be detected and a three-dimensional moving stage, where the objective lens focuses array vortex beam on the sample to be detected placed on the three-dimensional moving stage, and feeds back reflected light and scattered light to the array dark-field confocal detection module; and the array dark-field confocal detection module includes the following components in sequence according to a direction of light propagation: an aperture diaphragm array, a focusing lens, a single-mode optical fiber and a PMT detector, and the scattered light is collected to obtain vortex dichroic scattering signals.

Further, the laser emits the linearly polarized laser, and a polarization direction of a light beam is regulated to circularly polarized light by the half-wave plate and the quarter-wave plate.

Further, the light beam is changed in a propagation direction by the one-dimensional scanning galvanometer, irradiates to the array vortex wave plate after passing through the scanning lens and the tube lens in sequence, the array vortex wave plate includes a vortex phase array, each vortex phase distribution exp (imφ) corresponds to an order m, the light beam irradiates on the vortex phase array to generate m-order vortex illumination light beams, and the light beam is incident on centers of ±m-order vortex phase diagrams, where m=0, 1, 2 . . . and 10.

Further, after passing through the non-polarizing beam splitter, vortex illumination light beams at various orders passing through the array vortex wave plate are focused on the same focal point on the sample to be detected by the objective lens, and reflected light and scattered light collected by the objective lens are refracted to the aperture diaphragm array through the non-polarizing beam splitter. The non-polarizing beam splitter splits the beams at 50:50, where the light beam is incident on the sample to be detected from left to right, and the return light of the sample is reflected by the non-polarizing beam splitter after being transmitted from right to left, so that two light paths are presented; and the reflected light is filtered out by the aperture diaphragm array, and only the scattered light is received.

Further, a center position of each clear aperture on the aperture diaphragm array is the same as that of a vortex phase of the array vortex wave plate, clear apertures are the same, and the specific aperture size is matched with a central dark spot of the annular vortex light reflected under the illumination of 1-order vortex illumination beam.

Further, the scattered light passing through the aperture diaphragm array enters the focusing lens, and couples into the single-mode optical fiber, and the PMT detector collects scatted light signals and records signal strength.

Further, differences between scattered light signals collected by the PMT detector under the illumination of a +m-order vortex illumination light beam and scattered light signals collected by the PMT detector under the illumination of a −m-order vortex illumination light beam are identified to obtain the vortex dichroic scattering signals. The collected scattered light signals are PMT signal.

The present disclosure provide a dark-field confocal microscopic measurement method based on vortex dichroism, and the method is implemented by the dark-field confocal microscopic measurement apparatus based on vortex dichroism, including the following specific steps:

step a, emitting linearly polarized laser from the laser, and regulating a polarization direction of a light beam to circularly polarized light by the half-wave plate and the quarter-wave plate;

step b. changing a propagation direction of the circularly polarized light through the one-dimensional scanning galvanometer, and loading 21 fixed voltages on the one-dimensional scanning galvanometer, so that the deflected light beam, after passing through a scanning lens and a tube lens, is separately incident on centers of ±m-order vortex phase diagrams on the array vortex wave plate, where m=0, 1, 2 . . . and 10, and vortex illumination beams are generated;

step c. focusing the vortex illumination light beams, after passing through a non-polarizing beam splitter, that pass through an array vortex wave plate on the same focal point on the sample to be detected by the objective lens;

step d. filtering out random-order vortex reflected light through an aperture diaphragm array after reflected light and scattered light collected by the objective lens pass through the non-polarizing beam splitter, and retaining the scattered light in a center of the light beam;

step e, focusing the scattered light to a single-mode optical fiber by a focusing lens, and collecting the scattered light by a PMT detector;

step f. identifying differences between PMT signals recorded by the PMT detector under illumination of ±m-order vortex illumination light beams to obtain vortex dichroic scattering signals; and step g. moving the sample to be detected by using a three-dimensional moving stage, changing the position of a focused light spot, returning to the step c to obtain vortex dichroic scattering signals of the position of the next focused light spot, and obtain a two-dimensional or three-dimensional image of the sample to be detected, and directly analyzing scattering signals under the 1-order vortex illumination to extract three-dimensional distribution information of defects such as subsurface scratches, abrasion, subsurface cracks, and bubbles.

Beneficial Effects first, the one-dimensional scanning galvanometer cooperates with the array vortex wave plate to generate vortex beam illumination samples, so that orders of illumination vortex light can be controlled in a flexible manner, and multifunctional detection is realized. The dark-field confocal signals under the illumination of the ±1-order vortex light can realize micro-nano structure detection and industrial sample defect detection, and the dark-field confocal signals under the illumination of ±m-order vortex light at a higher order can extract vortex dichroism scattering signals, that is, chirality information of the micro-nano structures, and second, the apparatus adopts a measurement scheme of dark-field detection, and the sensitivity of chiral detection is improved by separating the reflected signals from the scattering signals via the aperture diaphragm array.

BRIEF DESCRIPTION OF THE DRAWINGS

FIG. 1 is a schematic structural diagram of a dark-field confocal microscopic measurement apparatus based on vortex dichroism provided in the present disclosure.

In the accompanying drawings: 1—laser; 2—half-wave plate; 3—quarter-wave plate; 4—one-dimensional scanning galvanometer; 5—scanning lens; 6—tube lens; 7—array vortex wave plate; 8—non-polarizing beam splitter; 9—objective lens; 10—sample to be detected; 11 three-dimensional moving stage; 12—aperture diaphragm array; 13—focusing lens; 14—single-mode optical fiber; and 15—PMT detector.

DETAILED DESCRIPTIONS OF THE EMBODIMENTS

Exemplary embodiments of the present disclosure will be described below in conjunction with the accompanying drawings. For the sake of clarity and conciseness, not all features of the actual implement are described in the description. However, it should be understood that many implementation-specific decisions must be made in the process of developing any such practical embodiment, so as to achieve specific objectives of the developers, such as meeting those restrictions associated with the system and the business, and those restrictions vary with the implementation. It should be also understood that although the development work is likely to be very complex and time-consuming, such development work is merely a routine task for those skilled in the art who benefit from the disclosure of the present disclosure.

It should be further noted that, in order to avoid obscuring the present disclosure due to unnecessary details, only the structure and/or processing steps closely related to the solution according to the present disclosure are shown in the accompanying drawings, while other details that have little to do with the present disclosure are omitted.

Embodiment 1

As shown in FIG. 1, the present embodiment provide a dark-field confocal microscopic measurement apparatus based on vortex dichroism, which is configured for realizing a dark-field chiral measurement function of samples.

The apparatus includes an array vortex light generation module, an array vortex light illumination module and an array dark-field confocal detection module;

the array vortex light generation module generates annular light illumination, and includes the following components in sequence according to a direction of light propagation: a laser 1, a half-wave plate 2, a quarter-wave plate 3, a one-dimensional scanning galvanometer 4, a scanning lens 5, a tube lens 6 and an array vortex wave plate 7, a vortex illumination light beam is generated and irradiated to the array vortex light illumination module via a non-polarizing beam splitter 8;

the laser 1 emits linearly polarized laser, a state of polarization is regulated by the half-wave plate 2 and the quarter-wave plate 3, and the one-dimensional scanning galvanometer 4, the scanning lens 5 and the tube lens 6 make the light beam pass through centers of different-order vortex phases of the array vortex wave plate 7 to generate an annular vortex illumination beam;

the array vortex light illumination module includes the following components in sequence according to a direction of light propagation: the non-polarizing beam splitter 8, an objective lens 9, a sample to be detected 10 and a three-dimensional moving stage 11, where the objective lens 9 focuses a light beam on the sample to be detected 10 placed on the three-dimensional moving stage 11, and feeds back reflected light and scattered light to the array dark-field confocal detection module;

the array dark-field confocal detection module includes the following components in sequence according to a direction of light propagation: an aperture diaphragm array 12, a focusing lens 13, a single-mode optical fiber 14 and a PMT detector 15, and the feedback scattered light is collected to obtain vortex dichroic scattering signals; and the objective lens 9 collects the reflected light and the scattered light of the sample, blocks the annular reflected light through the aperture diaphragm array 12, and the focusing lens 13 focuses the scattered light to the single-mode optical fiber 14 and records the scattered light by the PMT detector 15.

More specifically, the laser 1 emits the linearly polarized laser, and a polarization direction of a light beam is regulated to circularly polarized light by the half-wave plate 2 and the quarter-wave plate 3.

More specifically, the light beam is changed in a propagation direction by the one-dimensional scanning galvanometer 4, irradiates to the array vortex wave plate 7 after passing through the scanning lens 5 and the tube lens 6, the array vortex wave plate 7 includes a vortex phase array, each vortex phase distribution exp (imφ) corresponds to an order m, the light beam irradiates on the vortex phase array to generate m-order vortex illumination light beams, and the light beam is incident on centers of ±m-order vortex phase diagrams, where m=0, 1, 2 . . . and 10.

More specifically, after passing through the non-polarizing beam splitter 8, vortex illumination light beams at various orders passing through the array vortex wave plate 7 are focused on the same focal point on the sample to be detected 10 by the objective lens 9, and reflected light and scattered light collected by the objective lens 9 are refracted to the aperture diaphragm array 12 through the non-polarizing beam splitter 8.

More specifically, a center position of each clear aperture on the aperture diaphragm array 12 is the same as that of a vortex phase of the array vortex wave plate 7, clear apertures are the same, and the specific aperture size is matched with a central dark spot of the annular vortex light reflected under the illumination of 1-order vortex illumination beams.

More specifically, the scattered light passing through the aperture diaphragm array 12 enters the focusing lens 13, and couples into the single-mode optical fiber 14, and the PMT detector 15 collects scatted light signals and records signal strength.

More specifically, differences between PMT signals collected by the PMT detector 15 under the illumination of a +m-order vortex illumination light beam and PMT signals collected by the PMT detector 15 under the illumination of a −m-order vortex illumination light beam are identified to obtain the vortex dichroic scattering signals.

Embodiment 2

The present embodiment provide a dark-field confocal microscopic measurement method based on vortex dichroism, which is adopted for realizing dark-field confocal detection and chiral detection functions of samples. The method includes the following specific steps:

step a, emitting linearly polarized laser from the laser 1, and regulating the polarization direction of the light beam to circularly polarized light by the half-wave plate 2 and the quarter-wave plate 3;

step b. changing the propagation direction of the circularly polarized light through the one-dimensional scanning galvanometer 4, and loading 21 fixed voltages on the one-dimensional scanning galvanometer 4, so that the deflected light beam, after passing through the scanning lens 5 and the tube lens 6, is separately incident on centers of ±m-order vortex phase diagrams, where m=0, 1, 2 . . . and 10, and vortex illumination beams are generated;

step c. having the vortex illumination light beams that pass through the array vortex wave plate 7 after passing through the non-polarizing beam splitter 8 focused on the same focal point on the sample to be detected 10 by the objective lens 9;

step d. filtering out random-order vortex reflected light through the aperture diaphragm array 12 after reflected light and scattered light collected by the objective lens 9 pass through the non-polarizing beam splitter 8, and retaining the scattered light in a center of the light beam;

step e, focusing the scattered light to the single-mode optical fiber 14 by the focusing lens 13, and collecting the scattered light by the PMT detector 15;

step f. identifying differences between PMT signals recorded by the PMT detector 15 under the illumination of ±m-order vortex illumination light beams to obtain vortex dichroic scattering signals; and step g. moving the sample to be detected 10 by using the three-dimensional moving stage 11, changing the position of a focused light spot, and returning to the step c to obtain vortex dichroic scattering signals of the position of the next focused light spot.

More specifically, the laser beams emitted by the laser 1 have a wavelength of 400 nm-620 nm.

Although the implementation disclosed in the present disclosure is described as above, the contents thereof are only the implementation adopted to facilitate the understanding of the technical solutions of the present disclosure, and are not intended to limit the present disclosure. Those skilled in the art to which the present disclosure belongs may make any modifications and changes in the form and details of the implementation without departing from the core technical solution disclosed in the present disclosure, but the scope of protection limited by the present disclosure shall still be subject to the scope limited by the appended claims.

The invention claimed is:

1. An apparatus, comprising an array vortex light generation module, an array vortex light illumination module and an array dark-field confocal detection module;
   wherein the array vortex light generation module comprises, along a direction of light propagation, a laser, a half-wave plate, a quarter-wave plate, a one-dimensional scanning galvanometer, a scanning lens, a tube lens and an array vortex wave plate;
   wherein the array vortex light illumination module comprises, along the direction of light propagation, a non-polarizing beam splitter, an objective lens, a three-dimensional moving stage configured to support a sample,
   wherein the objective lens is configured to focus vortex illumination light beams onto the sample, and is configured to collect light from the sample;
   wherein the non-polarizing beam splitter is configured to direct the light from the sample into the array dark-field confocal detection module; and
   wherein the array dark-field confocal detection module comprises, along the direction of light propagation, an aperture diaphragm array, a focusing lens, a single-mode optical fiber and a photomultiplier tube (PMT) detector.

2. The apparatus according to claim 1, wherein the laser is configured to emit a linearly polarized laser beam, and the half-wave plate and the quarter-wave plate collectively are configured to transform the linearly polarized laser beam into a circularly polarized laser beam.

3. The apparatus according to claim 2, wherein the one-dimensional scanning galvanometer is configured to direct the circularly polarized laser beam to the array vortex wave plate through the scanning lens and the tube lens,
   wherein the array vortex wave plate comprises a vortex phased array configured to generate the vortex illumination light beams from the circularly polarized laser beam, wherein the vortex illumination light beams comprise ±m-order vortex illumination light beams respectively incident at centers of ±m-order vortex phase diagrams, wherein m=0, 1, 2, . . . , and 10.

4. The apparatus according to claim 3, wherein the objective lens is configured to focus the vortex illumination light beams on a same focal point on the sample, and wherein the aperture diaphragm array is configured to refract the light from the sample.

5. The apparatus according to claim 3, wherein a center of each aperture in the aperture diaphragm array corresponds to a center of a vortex phase of the array vortex wave plate and a size of each aperture in the aperture diaphragm array and a size of the vortex phase of the array vortex wave plate corresponding thereto are a size of a central dark spot of an annular vortex light reflected by the sample illuminated by the 1-order vortex illumination light beam.

6. The apparatus according to claim 4, wherein the focusing lens is configured to couple the light from the sample into the single-mode optical fiber, and the PMT detector is configured to measure a magnitude of the light from the sample.

7. The apparatus according to claim 6, configured to obtain vortex dichroic scattering signals based on differences between the light from the sample caused by illumination of the +m-order vortex illumination light beams and the light from the sample caused by the −m-order vortex illumination light beam.

8. A method using the apparatus according to claim 1, comprising:
   emitting a linearly polarized laser beam from the laser, and transforming the linearly polarized laser beam into a circularly polarized laser beam;
   directing the circularly polarized laser beam to the array vortex wave plate;
   focusing the vortex illumination light beams onto the same focal point on the sample;
   filtering out random-order vortex light from the light from the sample using the aperture diaphragm array;
   coupling the light into the single-mode optical fiber using the focusing lens, and collecting the light from the single-mode optical fiber using the PMT detector;
   obtaining vortex dichroic scattering signals based on differences between the light from the sample caused by illumination of the +m-order vortex illumination light beam and the light from the sample caused by the −m-order vortex illumination light beam; and
   moving the sample using the three-dimensional moving stage.

* * * * *